United States Patent
Yu et al.

(10) Patent No.: US 10,425,638 B2
(45) Date of Patent: Sep. 24, 2019

(54) EQUIPMENT AND METHOD FOR PROMPTLY PERFORMING CALIBRATION AND VERIFICATION OF INTRINSIC AND EXTRINSIC PARAMETERS OF A PLURALITY OF IMAGE CAPTURING ELEMENTS INSTALLED ON ELECTRONIC DEVICE

(71) Applicant: MULTIMEDIA IMAGE SOLUTION LIMITED, Dublin (IE)

(72) Inventors: Li Yu, Hangzhou (CN); Wang Miao, Hangzhou (CN); Jian-Hua Lin, Hangzhou (CN); Jin Wang, Hangzhou (CN)

(73) Assignee: MULTIMEDIA IMAGE SOLUTION LIMITED, Dublin (IE)

( * ) Notice: Subject to any disclaimer, the term of this patent is extended or adjusted under 35 U.S.C. 154(b) by 0 days.

(21) Appl. No.: 15/801,692

(22) Filed: Nov. 2, 2017

(65) Prior Publication Data

US 2018/0213218 A1  Jul. 26, 2018

Related U.S. Application Data

(62) Division of application No. 15/412,301, filed on Jan. 23, 2017.

(51) Int. Cl.
| | |
|---|---|
| *H04N 17/02* | (2006.01) |
| *H04N 17/00* | (2006.01) |
| *G06T 7/80* | (2017.01) |
| *G06K 9/62* | (2006.01) |
| *G06K 9/20* | (2006.01) |
| *H04N 5/232* | (2006.01) |

(52) U.S. Cl.
CPC ............. *H04N 17/002* (2013.01); *G06K 9/20* (2013.01); *G06K 9/6211* (2013.01); *G06T 7/80* (2017.01); *H04N 5/23238* (2013.01); *H04N 5/23296* (2013.01); *G06K 2009/2045* (2013.01)

(58) Field of Classification Search
CPC ........................... H04N 5/2256; H04N 17/002
USPC .................................................. 348/188, 148
See application file for complete search history.

(56) References Cited

U.S. PATENT DOCUMENTS

2010/0194886 A1* 8/2010 Asari .................... G06T 7/85
348/148

* cited by examiner

*Primary Examiner* — Jefferey F Harold
*Assistant Examiner* — Sihar A Karwan
(74) *Attorney, Agent, or Firm* — Bacon & Thomas, PLLC (57) ABSTRACT

The present invention is to provide an image processing equipment and method, for enabling an electronic device having a plurality of image capturing elements installed thereon to capture calibration sample images of a parameter calibration module and verification sample images of a parameter verification module, wherein the parameter calibration module is formed by four calibration identification boards each having a chess board pattern printed thereon and arranged parallelly in a predetermined angle with each other, the parameter verification module is formed by four verification identification boards each having a chess board pattern printed thereon and arranged in parallel with each other, so as for the electronic device to promptly calibrate the intrinsic and extrinsic parameters of the mage capturing elements according to the calibration sample images and then to promptly verify the correctness of the calibrated intrinsic and extrinsic parameters according to the verification sample images.

3 Claims, 8 Drawing Sheets

EQUIPMENT AND METHOD FOR PROMPTLY PERFORMING CALIBRATION AND VERIFICATION OF INTRINSIC AND EXTRINSIC PARAMETERS OF A PLURALITY OF IMAGE CAPTURING ELEMENTS INSTALLED ON ELECTRONIC DEVICE

CROSS REFERENCE TO RELATED APPLICATIONS

This application is a divisional application of U.S. patent application Ser. No. 15/412,301, filed on Jan. 23, 2017 (of which the entire disclosure of the pending, prior application is hereby incorporated by reference).

FIELD OF THE INVENTION

The present invention relates to an image processing equipment and method, more particularly to an equipment and a method for enabling an electronic device having a plurality of image capturing elements installed thereon to capture calibration sample images of a parameter calibration module and verification sample images of a parameter verification module, respectively, wherein the parameter calibration module is formed by four calibration identification boards each having a chess pattern arranged parallelly in a predetermined angle (such as 30 degrees) with each other, and the parameter verification module is formed by four verification identification boards each having a chess pattern arranged in parallel with each other, so as for the electronic device to promptly calibrate the intrinsic and extrinsic parameters of the image capturing elements according to the calibration sample images and then promptly verify the correctness of the calibrated intrinsic and extrinsic parameters of the image capturing elements according to the verification sample and to assign the calibrated intrinsic and extrinsic parameters to be the default intrinsic and extrinsic parameters of the image capturing elements, and thereby allowing the electronic device to be able to perform a precise and clear optical zooming mechanism or to perform a precise and clear stitching mechanism for producing a high image quality panoramic image, or to perform a reconstructing mechanism for producing a high quality 3D image by utilizing the images respectively captured by the image capturing elements according to the default intrinsic and extrinsic parameters of the image capturing elements.

BACKGROUND OF THE INVENTION

Recently, with the improvement of economic conditions, many people have had the ability to travel abroad to see the longed-for landscapes with their own eyes and take pictures of the beauty in sight as a souvenir to remember the scenery by using the smartphones or digital cameras carried with them. However, a series of photos taken of the same site can never compare to a "panoramic photo", which can record the grandeur of a magnificent view more realistically than separate photos.

As smartphones and digital cameras become more and more affordable, there is almost no tourist without carrying one of them. In addition, since there are lots of image editing software now available in the market, many people have lots of accesses to learn how to combine a series of photos taken of the same site into a panoramic photo through using such software, in order to show the indescribable beauty they witnessed on their journeys. Today, many smartphones and digital cameras also have a "panorama function", by which to take panoramic photo a user only has to switch the smartphone or digital camera at hand to the "panorama mode" and then to perform a "horizontal scanning" operation, and a panoramic photo will be produced via the image processing software installed in the smartphone or digital camera.

But how to produce such an overwhelming panoramic photo? It must be understood in the first place that a panoramic photo of high image quality is in fact an assembly of a number of photos. More specifically, a plurality of photos of the same scenic spot have to be taken horizontally and consecutively by the smartphone or digital camera and then sequentially stitched together through using a suitable image editing software (e.g., Photoshop) installed in the smartphone or digital camera. Take an ordinary digital single-lens reflex camera as an example. Since the view angle of the lens installed on these ordinary smartphone or digital camera is generally 60 degrees, therefore, at least eight photos must be taken in order to produce a 360-degree panoramic photo of high image quality. Basically, the more photos are stitched together, the better the result. When producing a 360-degree panoramic photo, it is very crucial that each constituent photo has an appropriate portion reserved as an "overlap area", and the larger the overlap area, the better the stitching result. This is especially true when a lens having a relatively short focal length (e.g., 18 mm, 28 mm, etc.) is used on the smartphone or digital camera because it is difficult to stitch together photos each having a strong sense of perspective, and a more natural stitching result can be obtained in such a difficult situation by taking more photos and making the overlap area as large as possible. To ensure that a 360-degree panoramic photo has high image quality, it is a common practice to take more than ten or even dozens of photos of the same site in a horizontal and consecutive manner, then adjust the brightness and colors of each photo by utilizing suitable image editing software in order to achieve consistency in brightness and hue, then stitch together the overlap areas of each two adjacent photos with the image editing software, and finally trim the sides of the stitched-together photo through the cutting tool provided by the image editing software in order to obtain the desired high-quality 360-degree panoramic photo.

While the foregoing process of taking a series of photos horizontally and successively of the same site and stitching the photos together with image editing software is already a technique frequently used by a few professional photographers to make high-quality 360-degree panoramic photos, however, as an amateur may, even under the guidance of a professional photographer, find it is not only very difficult to determine the number of photos should be taken and the size of the overlap areas should be left on each photo, but also not to mention the complicated editing process that follows, including adjusting the brightness and colors of each photo, stitching the photos together, trimming the composite photo, and so on. It is truly a shame that only few people are capable of using image editing software to combine a series of photos taken horizontally and sequentially of a scenic spot into a 360-degree panoramic photo of high image quality.

Accordingly, the issue to be addressed by the difficulties in determining the number of photos and the size of the overlap areas to be taken is to design a method for producing a panoramic photo by a stitching process, allowing a user to only take two photos and then apply the stitching process to stitch the photos rapidly and precisely together to form a 360-degree panoramic photo of high image quality.

In addition, in recent years, due to the rapid development of electronic technology, the camera features of the smartphones are also becoming very powerful. In order to create two different special lenses, the "dual-lenses" or "multi-lenses" designs are thus becoming to be a requisite accessory on a new generation of smartphones.

(3) Dual-lenses technology unable to achieve a clear and precise optical zooming mechanism: For instance, in 2014, HTC Corporation launched an "One M8" type smartphone having a function of providing the world's first dual depths of field while capturing images, of which the "dual-lenses" technology is built-in with an "Ultra-Pixel with Duo Camera" developed and designed by Altek Corporation, and the "Duo Camera" has a primary lens and a secondary lens installed at the rear surface of the smartphone and capable of working together for capturing images, wherein the primary lens is large than the secondary lens and responsible for capturing the image, and the secondary lens is responsible for recording depth information of the environment, so that a user is able to change the focus position of the image through operating user interface of the smartphone after capturing the image. In November 2015, LG Corporation launched a "V10" type smartphone, which is built-in with an image sensor having 5 million pixels along with a 80-degree normal lens and another image sensor having 5 million pixels along with a 120-degree ultra-wide-angle lens, wherein the dual front lenses design can be chosen to be operated in a standard-angle field of view or a wide-angle field of view at the time of selfie, the 120-degree wide-angle lens can capture the image of the entire background (even the image of a group of people) during selfie, and the 80-degree normal lens can capture the close-up image during selfie. In 2016, LG Corporation released a "G5" type smartphone, of which the dual-lenses design is built-in on the rear surface of the smartphone with an image sensor having 16 million pixels along with a 78-degree normal lens and another image sensor having 8 million pixels along with a 135-degree ultra-wide-angle lens, wherein the 135-degree ultra-wide-angle lens is able to provide a view angle 1.7 times wider (even 15 degrees wider than the view angle of naked eye) than that of the other smartphones in the market, so that a user can use the smartphone to easily capture more image of a scene without having to keep a long distance with the scene. In addition, many science and technology media also predicted that Apple Corporation may release an "iPhone7" in 2016 built-in with dual-lenses design, which may include two image capturing elements having different focal lengths respectively, so as to enable the "iPhone7" to be switched and operated in a standard mode or a remote scene mode for capturing images. However, in view of the above, none of the aforementioned dual-lenses designs is able to achieve clear and precise optical zooming mechanism on behalves of the smartphones.

Figure 1:
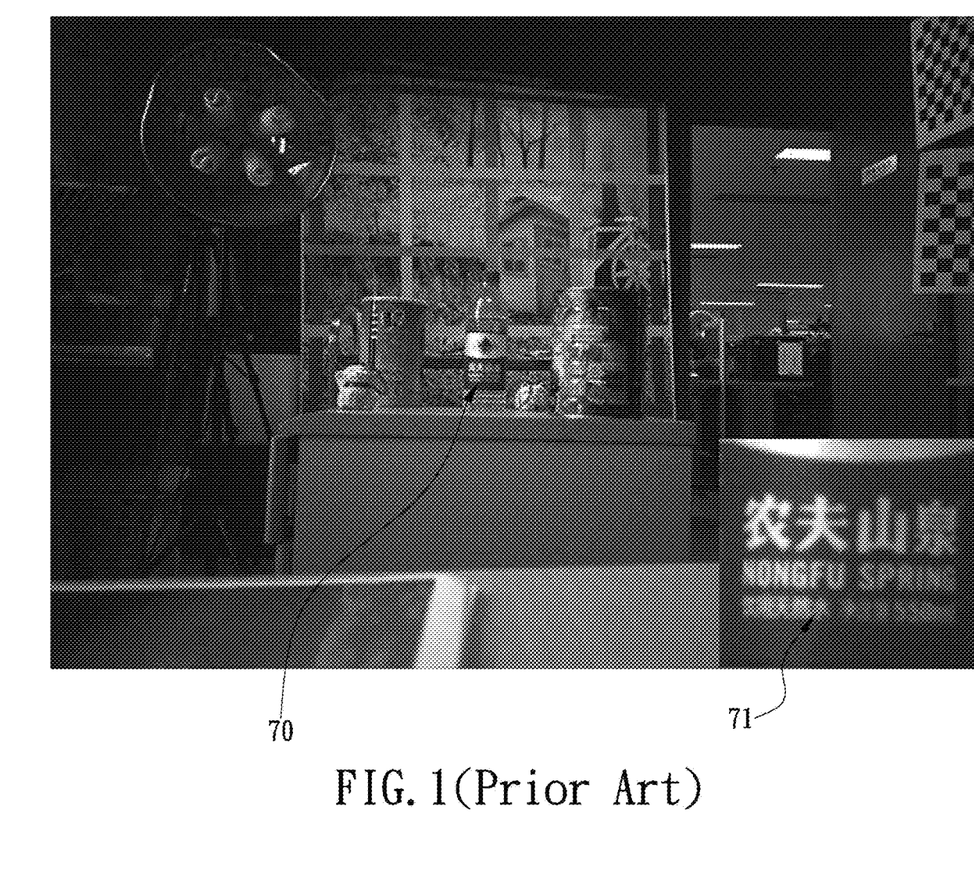
FIG. 1 is an image captured through a digital zooming by a single lens or dual-lenses camera of a conventional smartphone.

Why none of the dual-lenses designs implemented in the aforementioned smartphones is able to achieve a clear and precise optical zooming mechanism? The primary reason is that all the aforementioned smartphones are built-in with a standard lens and a wide-angle lens having a large aperture, which will inevitably cause the following problems during the zooming procedure:

(1) Causing image of an object being fixedly focused from a long distance to be blurred: Please refer to FIG. 1, because the standard lens and the wide-angle lens are unable to precisely and fixedly focus on the object 70 (such as the mineral water bottle shown in FIG. 1) from a long distance, so that it will be easy to produce blurred image 71 on the object 70 (such as the blurred text image on the mineral water bottle shown in the right bottom corner of FIG. 1) while the object 70 being zoomed in.

Figure 2:
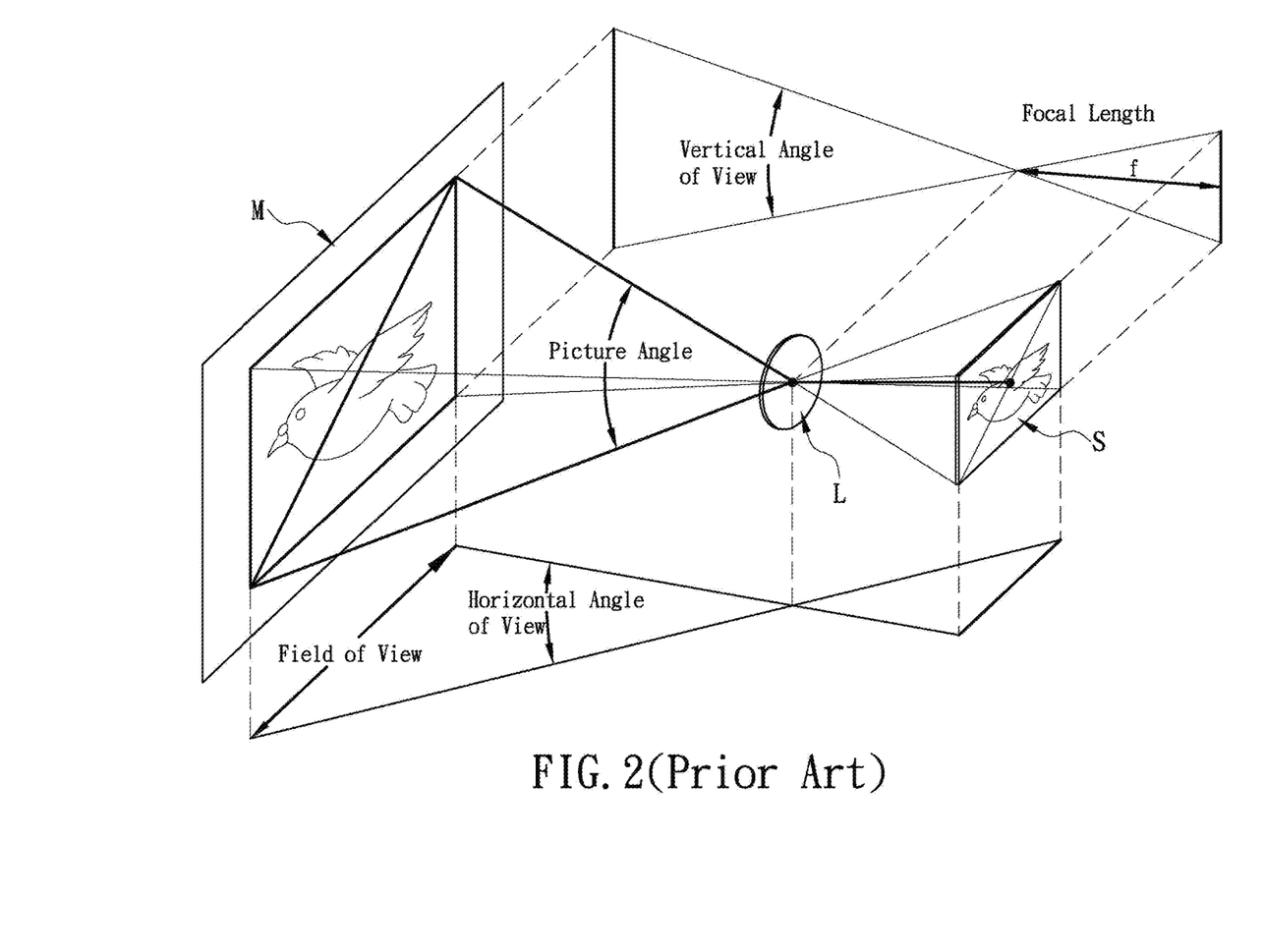
FIG. 2 is a schematic view of the hardware parameters of the image capturing element.
Figure 3A:
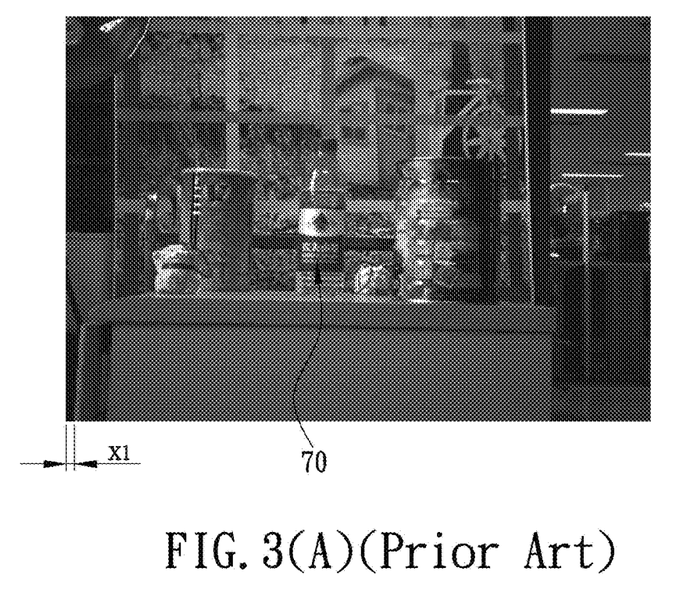
FIGS. 3(A) and 3(B) are images captured through a digital zooming by a single lens or dual-lenses camera of a conventional smartphone, wherein the object within the images obviously and abnormally skips between the images.
Figure 3B:
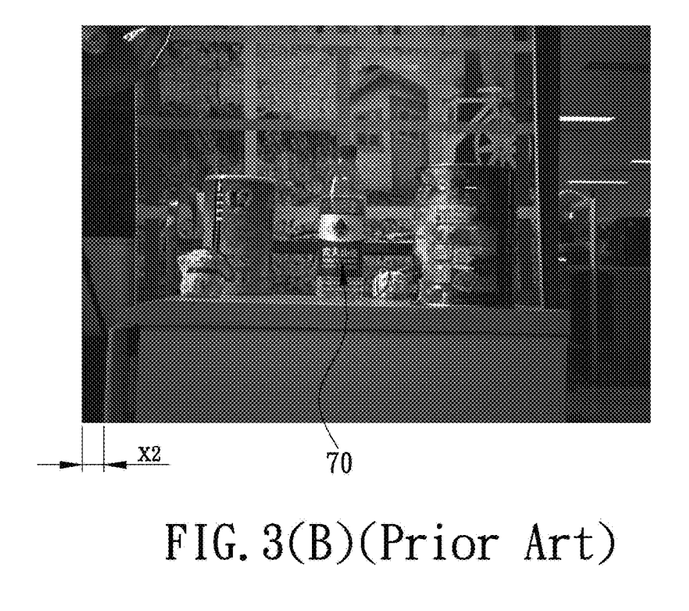

(2) Causing the object 70 within in the images captured in the zooming procedure to abnormally skip between the images: Please refer to FIG. 2, because the corresponding hardware parameters between the standard lens and the wide-angle lens (hereinafter also referring to as an image capturing element) must exist some differences, such as the differences between fields of view (hereinafter referred to as FOV), picture angles . . . and sizes of the corresponding image sensor chips (e.g., CMOS), which inevitably cause the images respectively captured by the standard lens and the wide-angle lens to be different in image ratio, and then cause the corresponding pixels on the images respectively captured by the standard lens and the wide-angle lens to be shifted and have offsets therebetween during the zooming procedure, such as zooming in the object from a zoom ratio of 1.79 (as shown in FIG. 3(A)) to a zoom ratio of 1.80 (as shown in FIG. 3(B)), whereby the object obviously and abnormally skips within the two images (such as causing an obvious and abnormal transition skip from x1 to x2 as shown in FIGS. 3(A) and 3(B), respectively).

In view of the above-mentioned developing evolutions and history of the current dual-lenses smartphones, although the dual-lenses design applications in the current smartphones are quite diverse and differences, such as for enhancing the 3D performance, pulling up the depth of field, tracking face, providing ultra-wide angle, adding pixels, providing multi-apertures . . . and so on, but if the dual-lenses are merely designed to compensate for the lack of a single large aperture wide-angle lens design and do not provide an accurate and clear optical zooming mechanism, it will be very difficult to let the cameras of the smartphones reach to a new level comparable to a professional DSLR camera having the optical zooming function. Accordingly, it is an important issue of the present invention for designing and inventing an image processing equipment or method for enabling an electronic device (such as smartphone or digital camera) having a plurality of image capturing elements installed thereon to promptly perform calibration and verification of intrinsic and extrinsic parameters of the image capturing elements, and to assign the calibrated intrinsic and extrinsic parameters to be the default intrinsic and extrinsic parameters of the image capturing elements, and thereby allowing the electronic device to be able to perform a precise and clear optical zooming mechanism, to perform a precise and clear stitching mechanism for producing a high image quality panoramic image, or to perform a reconstructing mechanism for producing a high quality 3D image through utilizing the images respectively captured by the image capturing elements according to the default intrinsic and extrinsic parameters of the image capturing elements.

SUMMARY OF THE INVENTION

The primary objective of the present invention is to provide an equipment and a method for enabling an electronic device having a plurality of image capturing elements installed thereon to capture calibration sample images of a parameter calibration module and verification sample images of a parameter verification module, respectively, wherein the parameter calibration module is formed by four calibration identification boards each having a chess pattern arranged parallelly in a predetermined angle (such as 30 degrees) with each other, and the parameter verification module is formed by four verification identification boards each having a chess pattern arranged in parallel with each other, so as for the electronic device to promptly calibrate the intrinsic and extrinsic parameters of the image capturing elements according to the calibration sample images and then promptly verify the correctness of the calibrated intrinsic and extrinsic parameters of the image capturing elements according to the verification sample and to assign the calibrated intrinsic and extrinsic parameters to be the default intrinsic and extrinsic parameters of the image capturing elements, and thereby allowing the electronic device to be able to perform a precise and clear optical zooming mechanism, to perform a precise and clear stitching mechanism for producing a high image quality panoramic image, or to perform a reconstructing mechanism for producing a high quality 3D image by utilizing the images respectively captured by the image capturing elements according to the default intrinsic and extrinsic parameters of the image capturing elements.

BRIEF DESCRIPTION OF THE DRAWINGS

The above and other objectives, as well as the technical features and effects, of the present invention can be better understood by referring to the following detailed description in conjunction with the accompanying drawings, in which.

DETAILED DESCRIPTION OF THE INVENTION

Figure 4:
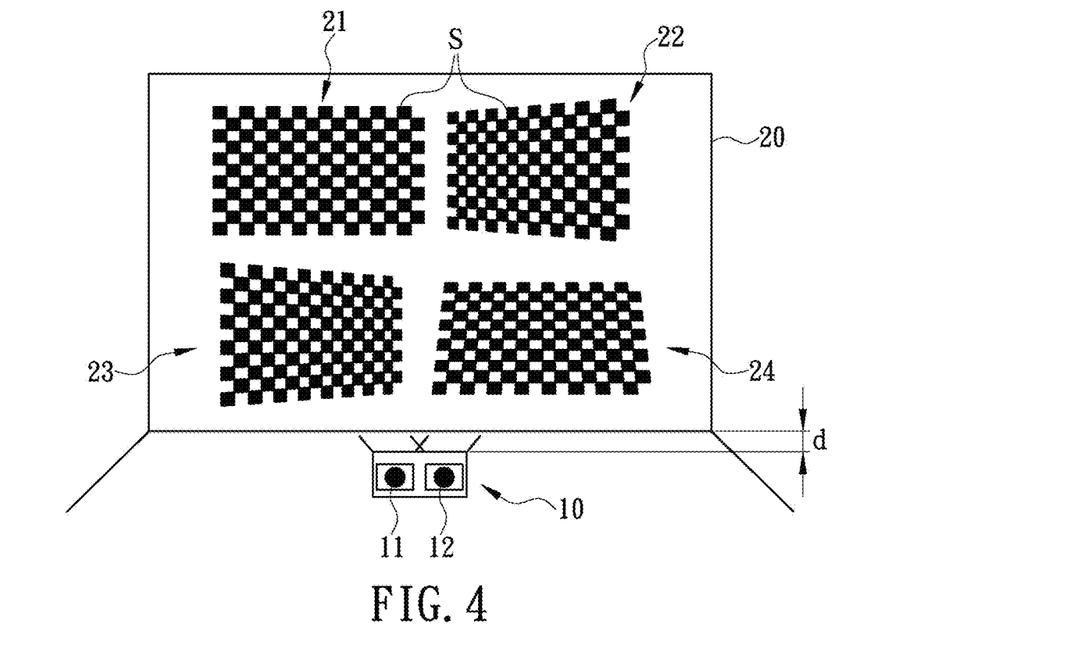
FIG. 4 is a schematic view of the equipment of the present invention.
Figure 5:
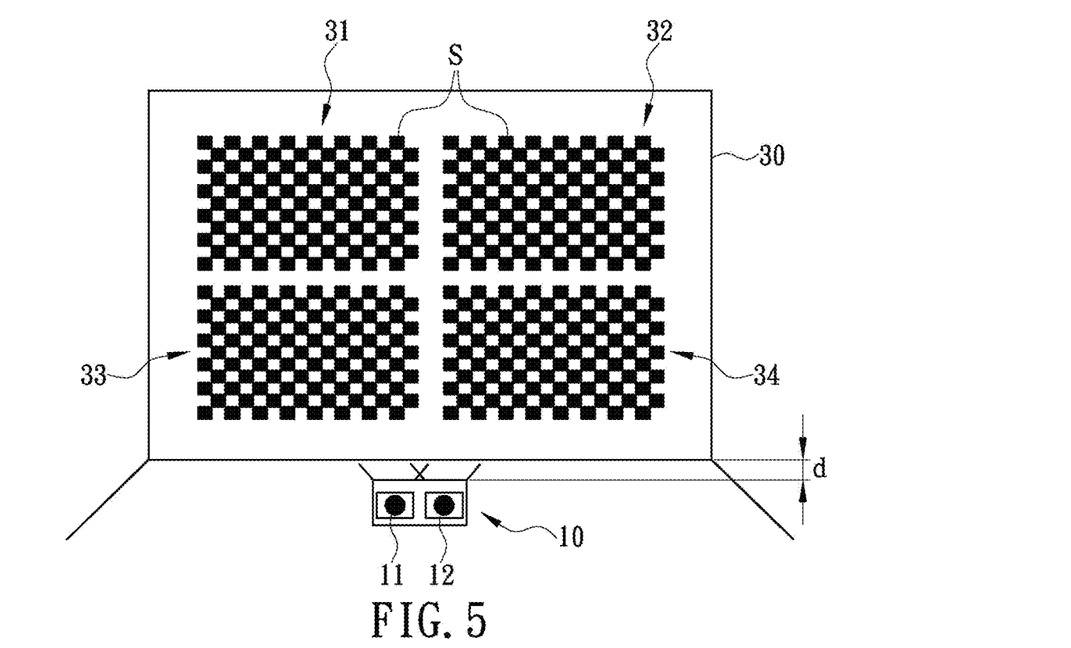
FIG. 5 is another schematic view of the equipment of the present invention.

Based on the image-taking principle stated above, please refer to FIGS. 4 and 5 the inventor of the present invention developed an image processing equipment for promptly performing calibration and verification of intrinsic and extrinsic parameters of a plurality of image capturing elements 11, 12 installed on an electronic device 10, wherein, the image processing equipment includes at least one electronic device 10 (such as smartphone, digital camera or tablet . . . , etc.), a parameter calibration module 20, and a parameter verification module 30, where the electronic device 10 each having at least one image capturing element 11, 12 installed thereon; the parameter calibration module 20 is integrally formed by four calibration identification boards 21, 22, 23, 24 each having a chess pattern printed thereon and arranged parallelly in a predetermined angle (such as 30 degrees) with each other, and the chess pattern includes a plurality of chess lattices S and a plurality of identification points representing the corner points of each chess lattice S, respectively; so as for the image capturing elements 11, 12 to capture calibration sample images of the identification points on the calibration identification boards 21, 22, 23, 24 from a fixed distance d in front of the center of the parameter calibration module 20 and then to promptly calibrate the intrinsic and extrinsic parameters of the image capturing elements 11, 12 according to the image coordinates of the identification points on the calibration sample images, and thereby allowing the electronic device 10 to be able to perform a precise and clear optical zooming mechanism, to perform a precise and clear stitching mechanism for producing a high image quality panoramic image, or to perform a reconstructing mechanism for producing a high quality 3D image by utilizing the images respectively captured by the image capturing elements 11, 12 according to the default intrinsic and extrinsic parameters of the image capturing elements 11, 12.

Please again refer to FIG. 5 of the present invention, the parameter verification module 30 is integrally formed by four verification identification boards 31, 32, 33, 34 each having a chess pattern printed thereon and arranged in parallel with each other, wherein the chess pattern includes a plurality of chess lattices S and a plurality of identification points representing the corner points of each chess lattice S, respectively; so as for the image capturing elements 11, 12 to capture verification sample images of the identification points on the verification identification boards 31, 32, 33, 34 from a fixed distance d in front of the center of the parameter verification module 30 and then to promptly verify the correctness of the calibrated intrinsic and extrinsic parameters of the image capturing elements 11, 12 according to the image coordinates of the identification points on the verification sample images, and then assign the calibrated intrinsic and extrinsic parameters to be the default intrinsic and extrinsic parameters of the image capturing elements 11, 12, and thereby allowing the electronic device 10 to be able to perform a precise and clear optical zooming mechanism, to perform a precise and clear stitching mechanism for producing a high image quality panoramic image, or to perform a reconstructing mechanism for producing a high quality 3D image by utilizing the images respectively captured by the image capturing elements 11, 12 according to the default intrinsic and extrinsic parameters of the image capturing elements 11, 12.

Figure 6:
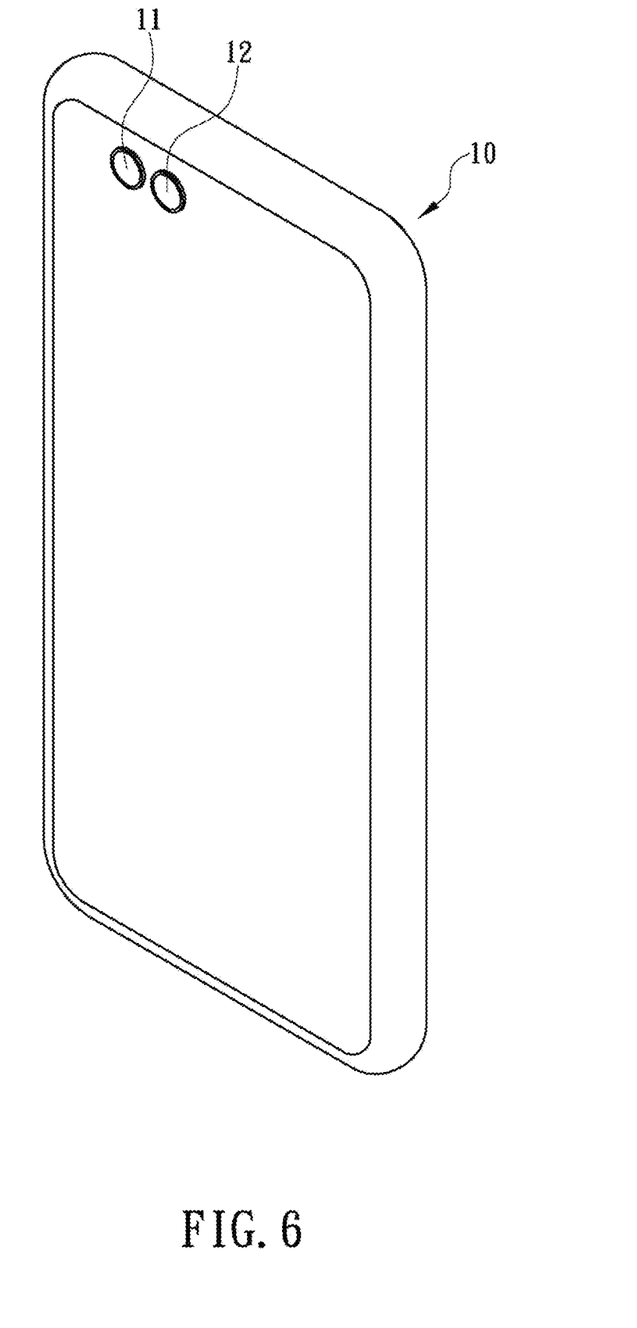
FIG. 6 is a preferred embodiment of the electronic device of the present invention having two image capturing devices installed thereon and fixedly spaced with each other.

Please refer to FIG. 6. In a preferred embodiment of the present invention, the electronic device 10 is a smartphone having two image capturing elements 11, 12 installed on a rear surface of the smartphone 10 and the two image capturing elements 11, 12 are fixedly spaced with each other, and can be activated by the smartphone 10 to capture the calibration sample images of the identification points on the calibration identification boards 21, 22, 23, 24 from the fixed distance d in front of the center of the parameter calibration module 20, respectively, for enabling the smartphone 10 to promptly calibrate the intrinsic and extrinsic parameters of the image capturing elements 11, 12 according to image coordinates of the identification points on the calibration sample images and, in the meantime, to capture the verification sample images of the identification points on the verification identification boards 31, 32, 33, 34 from the fixed distance d in front of the center of the parameter verification module 30 respectively, for enabling the smartphone 10 to promptly verify the correctness of calibrated intrinsic and extrinsic parameters of the image capturing elements 11, 12 according to image coordinates of the identification points on the verification sample images.

In the image processing equipment mentioned above, the parameter calibration module 20, and the parameter verification module 30 are preferably to be lighted up in a way of rear projection so as to ensure that every identification points on the calibration identification boards 21, 22, 23, 24 as well as on the verification identification boards 31, 32, 33, 34 can be clearly captured by the image capturing elements 11, 12, respectively.

Figure 7:
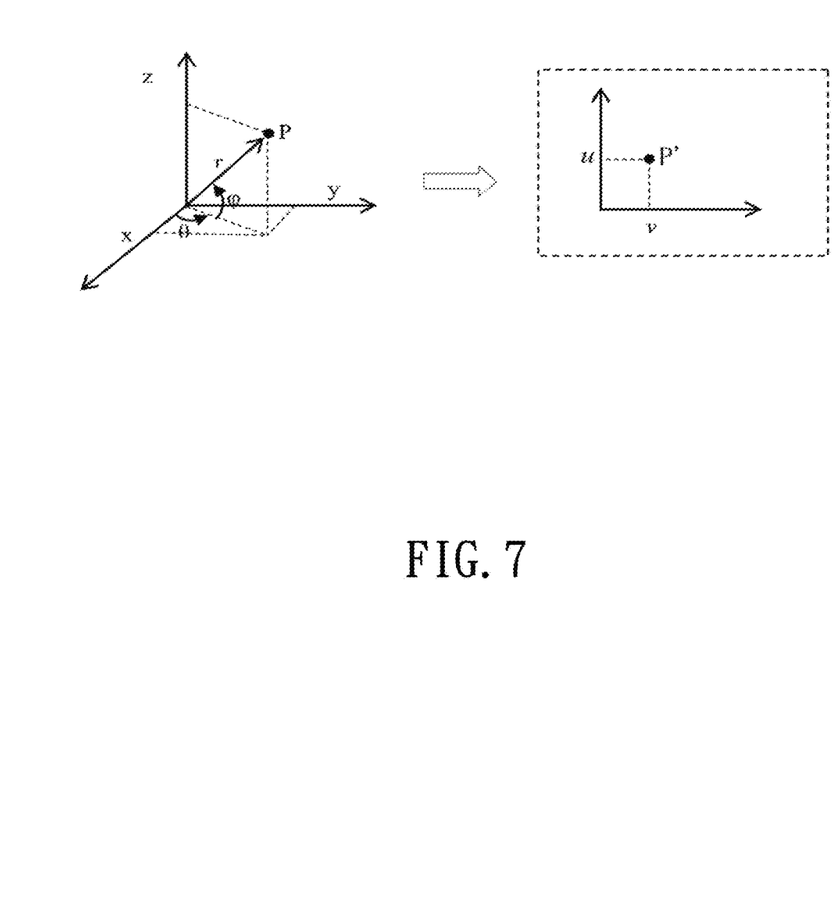
FIG. 7 is a schematic view of the mapping relationship between a plane coordinates system of an image captured by the image capturing element and a 3D coordinates system of the image capturing element.
Figure 8A:
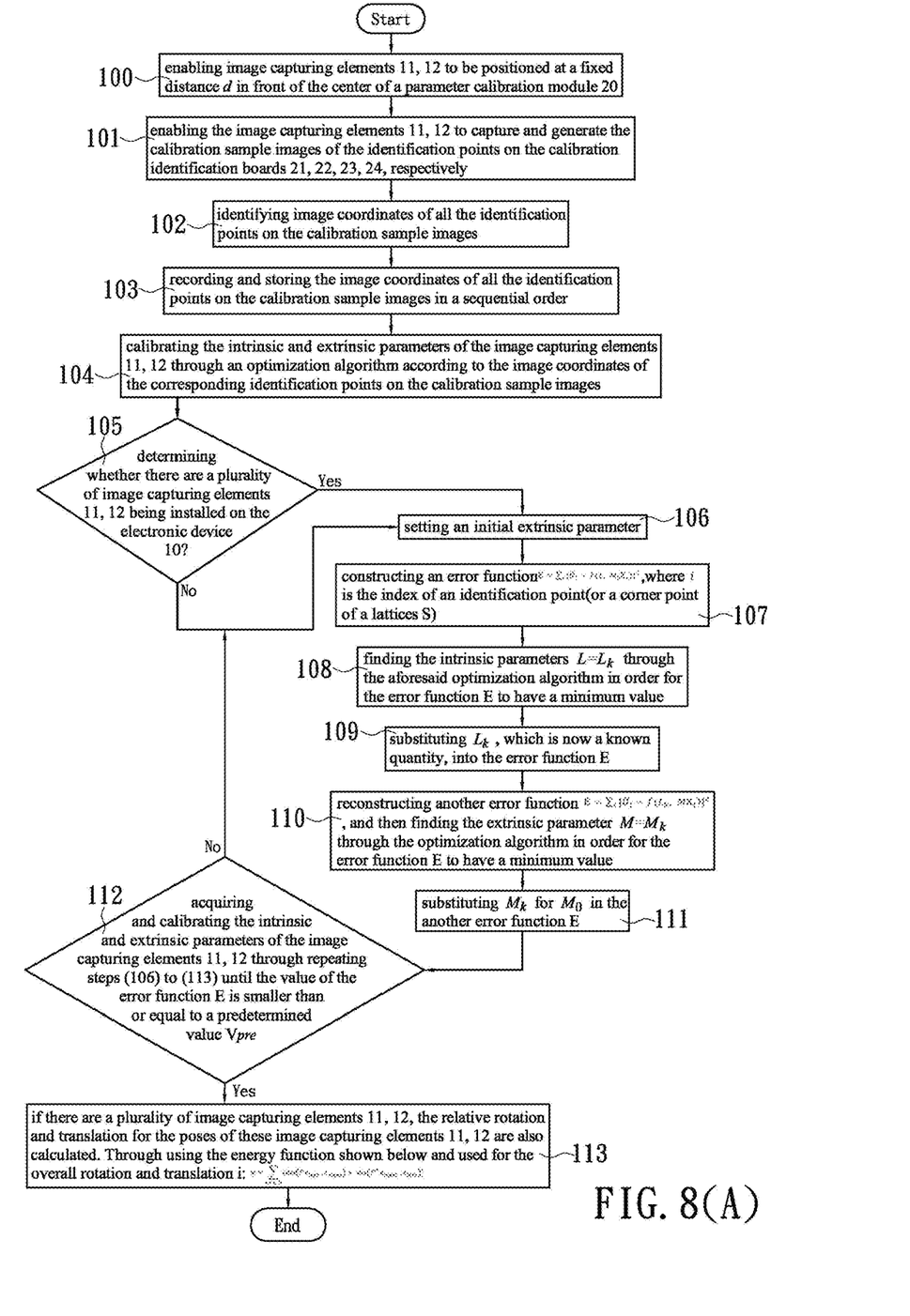
FIG. 8(A) is a flowchart of the calibration procedure of the method of the present invention.

Alternatively, please again refer to FIGS. 4 and 5, the inventor of the present invention also developed a method for promptly performing calibration and verification of the intrinsic and extrinsic parameters of a plurality of image capturing elements 11, 12 (such as a wide-angle image capturing element and a long-focus image capturing element) installed on an electronic device 10 (such as a smartphone, a digital camera or a tablet . . . , etc.), which is applied to the electronic device 10, and comprises a calibration procedure, please refer to FIG. 8(A), having steps to be performed by the electronic device 10, of:

(100) enabling image capturing elements 11, 12 to be positioned at a fixed distance d in front of the center of a parameter calibration module 20, wherein the parameter calibration module 20 is integrally formed by four calibration identification boards 21, 22, 23, 24 each having a chess pattern printed thereon and arranged parallelly in a predetermined angle (such as 30 degrees) with each other, and the chess pattern includes a plurality of chess lattices S and a plurality of identification points representing the corner points of each chess lattice S, respectively; wherein the fixed distance d should be large enough to allow the fields of view of the image capturing elements 11, 12 to be able to clearly capture all the identification points on the calibration identification boards 21, 22, 23, 24;

(101) enabling the image capturing elements 11, 12 to capture and generate the calibration sample images of the identification points on the calibration identification boards 21, 22, 23, 24, respectively;

(102) identifying image coordinates of all the identification points on the calibration sample images; please refer to FIG. 7, since the image capturing elements 11, 12 is capturing images in such a way by projecting a point P in a three-dimensional space, or more particularly the point $\overline{X}(X, Y, Z)$, to a point $\overline{U}(u, v)$ in a two-dimensional imaging plane to form a pixel P' in a two-dimensional image, wherein the relationship between the two coordinates systems (hereinafter referred to as the projection-based relationship) can be expressed by the following equation:

$$X_c = R_w X_w + T_w,$$

wherein $X_c$ representing point P in a three-dimensional space of the image coordinate system of the image capturing elements 11, 12, $X_w$ representing the image coordinate system of the corresponding identification point on the calibration identification boards 21, 22, 23, 24; $R_w$, $T_w$ representing the rotation and transition matrices between the image coordinate system of the corresponding identification point on the calibration identification boards 21, 22, 23, 24 and the image coordinate system of the image capturing, elements 11, 12. Thus, if there are 4 calibration identification boards 21, 22, 23, 24, there will be 4 couples of rotation and transition matrices for forming the imaging model of the image capturing, elements 11, 12 shown below:

$$u = f_x^* (x_d + \alpha^* y_d) + c_x$$

$$u = f_y * y_d + c_y,$$

wherein, u, v representing coordinates of the pixels on a two dimensional image, $f_x$, $f_y$ representing the focal length along the directions of coordinates X an Y, respectively, $C_x$ $C_y$ representing optical center parameters along the directions of coordinates X an Y, respectively, α representing skew parameter, $x_d$, $y_d$ are Normalized coordinate values corresponding to the skew parameter, and can be calculated and represented as follows:

$$x = X_c / Z_c$$
$$y = Y_c / Z_c$$
$$r = \sqrt{x^2 + y^2}$$
$$\begin{bmatrix} x_d \\ y_d \end{bmatrix} = (1 + k_1 r^2 + k_2 r^4 + k_3 r^6) \begin{bmatrix} x \\ y \end{bmatrix} + \begin{bmatrix} 2p_1 xy + p_2(r^2 + 2x^2) \\ p_1(r^2 + 2y^2) + 2p_2 xy \end{bmatrix}$$

Wherein $k_1, k_2, k_3, p_1, p_2$ are the skew parameters, x and y are the Normalized coordinate values. Wherein, M represents the extrinsic parameter of the image capturing elements 11, 12 and can be expressed by a rotation matrix to show the three-dimensional relationship between the different spatial positions from which the real-site images respectively captured by the image capturing elements 11, 12; and $f_x$, $f_y$ (focal lengths along X and Y coordinates), $c_x$, $c_y$ (offsets of the lens center along X and Y coordinates), and $k_i$ (aberration coefficient) are intrinsic parameters of the image capturing elements 11, 12, however, the above equations can be simplified and represented by the following function:

$$\overline{U}(u,v) = f(L, M\overline{X}),$$

where: L represents the intrinsic parameters of the image capturing elements 11, 12 and f represents the projection-based relationship.

if there are a plurality of image capturing elements 11, 12, the relative rotation and translation for the poses of these image capturing elements 11, 12 are also calculated. After the single camera calibration, the intrinsic and extrinsic matrix for the image capturing elements 11, 12 can be used to initialize the rotation and translation among multi elements 11, 12: Assume the rotation and translation matrices for the calibration identification boards 21 are $(R_1, T_1)$, $(R_2, T_2)$ respectively, the initial extrinsic matrices for these image capturing elements 11, 12 are:

$$R = R_2(R_1)^T$$

$$T = T_2 - RT_1$$

Since there are 4 calibration identification boards 21, 22, 23, 24, the same method can be used to calculate the overall rotation and translation matrices for the other three calibration identification boards 22, 23, 24.

The final (R,T) is the average of $(R_i, T_i)$

Another energy function which is used for the overall rotation and translation is showed below:

$$\gamma = \sum_{n=1...N} (dis(Fx_{left}, x_{right}) + dis(F^T x_{right}, x_{left}))$$

Where F is fundamental matrix, $F^T$ is the transpose of fundamental matrix. The dot production of F and point $x_{left}$ or $x_{right}$ is the coefficient of a line (e.g. for a line of ax+by+c=0, $Fx_{left}$ is equal to (a, b, c)). Dis means the distance between a line and a point. 1 ... N means N pairs of correspondences.

(103) recording and storing the image coordinates of all the identification points on the calibration sample images in a sequential order; and (104) calibrating the intrinsic and extrinsic parameters of the image capturing elements 11, 12 through an optimization algorithm according to the image coordinates of the corresponding identification points on the calibration sample images, wherein the optimization algorithm can be a gradient descent algorithm, conjugate gradient algorithm, or Levenberg-Marquardt algorithm, in the present invention, since such algorithms are not a technical feature of the present invention, no further description relating to the details of each algorithm is given hereinafter. In addition, as mentioned above, due to the imaging model of the image capturing elements 11, 12 can be defined as $\overline{U}(u, v) = f(L, M\overline{X})$, wherein $\overline{X}$ can be regarded as a known quantity because each corner point of the lattice S on the calibration boards 21, 22, 23, 24 can be given a specific coordinates in the 3-D space, therefore, under the same reason, $\overline{U}$, can also be viewed as a known quantity because the coordinates of each corner point of the lattice S on a calibration board 21, 22, 23, 24 can also be promptly obtained through a lattice point detection algorithm. Thus, the intrinsic parameters and the extrinsic parameters of the image capturing elements 11, 12 can be determined by the following steps:

(105) determining whether there are a plurality of image capturing elements 11, 12 being installed on the electronic device 10? If yes, performing the steps (106)~(113) for calibrating the intrinsic parameters of each of the image capturing elements 11, 12 as well as calibrating the extrinsic parameters between the image capturing elements 11, 12. If no, performing the step (106)~(113) merely for calibrating the intrinsic parameters of each of the image capturing elements 11, 12;

(106) setting an initial extrinsic parameter $M_o$; wherein each calibration sample image of the calibration board 21, 22, 23, 24 has its own image coordinates system, which also means each plane of the calibration board 21, 22, 23, 24 is located at a plane along the X and Y coordinates of its own image coordinates system, and the Z coordinates of the identification points on the calibration board 21, 22, 23, 24 are zero;

(107) constructing an error function $E = \Sigma_i |\overline{U}_i - f(L, M_o X_i)|^2$, where i is the index of an identification point (or a corner point of a lattices S);

(108) finding the intrinsic parameters $L = L_k$ through the aforesaid optimization algorithm in order for the error function E to have a minimum value;

(109) substituting $L_k$, which is now a known quantity, into the error function E;

(110) reconstructing another error function $E = \Sigma_i |\overline{U}_i - f(L_k, MX_i)|^2$, and then finding the extrinsic parameter $M = M_k$ through the optimization algorithm in order for the error function E to have a minimum value;

(111) substituting $M_k$ for $M_o$ in the another error function E; and (112) acquiring and calibrating the intrinsic and extrinsic parameters of the image capturing elements 11, 12 through repeating steps (106) to (112) until the value of the error function E is smaller than or equal to a predetermined value $V_{pre}$;

(113) if there are a plurality of image capturing elements 11, 12, the relative rotation and translation for the poses of these image capturing elements 11, 12 are also calculated.

Another energy function which is used for the overall rotation and translation is showed below:

$$\gamma = \sum_{n=1...N} (dis(Fx_{left}, x_{right}) + dis(F^T x_{right}, x_{left}))$$

Thus, based on the intrinsic parameters and the extrinsic parameters of the image capturing elements 11, 12, the electronic device 10 is able to project the images respectively captured by the image capturing elements 11, 12, either in whole or in part (e.g., only the overlap areas of the images), onto a spherical surface. The spherical surface can be subsequently spread out to form a two-dimensional spread-out picture (also referred to as a "spread-out spherical picture") if needed for producing a 360-degree spherical panorama. As referring again to FIG. 7, assume the spherical surface has a radius r and includes a point P whose three-dimensional coordinates are (x, y, z), where $x^2+y^2+z^2=r^2$. Then, $P^I(\theta, \varphi)$ is the point in the two-dimensional spread-out picture that corresponds to the point P(x, y, z) in the spherical surface, where $\theta=\text{atan}(y,x)$ and $\varphi=\text{atan}(z, \sqrt{x^2+y^2})$. Conversely, P(x,y,z) can be derived from $P^I(\theta,\varphi)$ according to the following equations:

$x = r \cos \varphi \cos \theta$ $y = r \cos \varphi \sin \theta$ $z = r \sin \varphi$.

Wherein, Γ represents the mapping relationship between the coordinate system of the spherical surface and the coordinate system of the two-dimensional spread-out picture. The foregoing equations can then be simplified into:

$P(x,y,x)=\Gamma(P^I(\theta,\varphi))$.

Figure 8B:
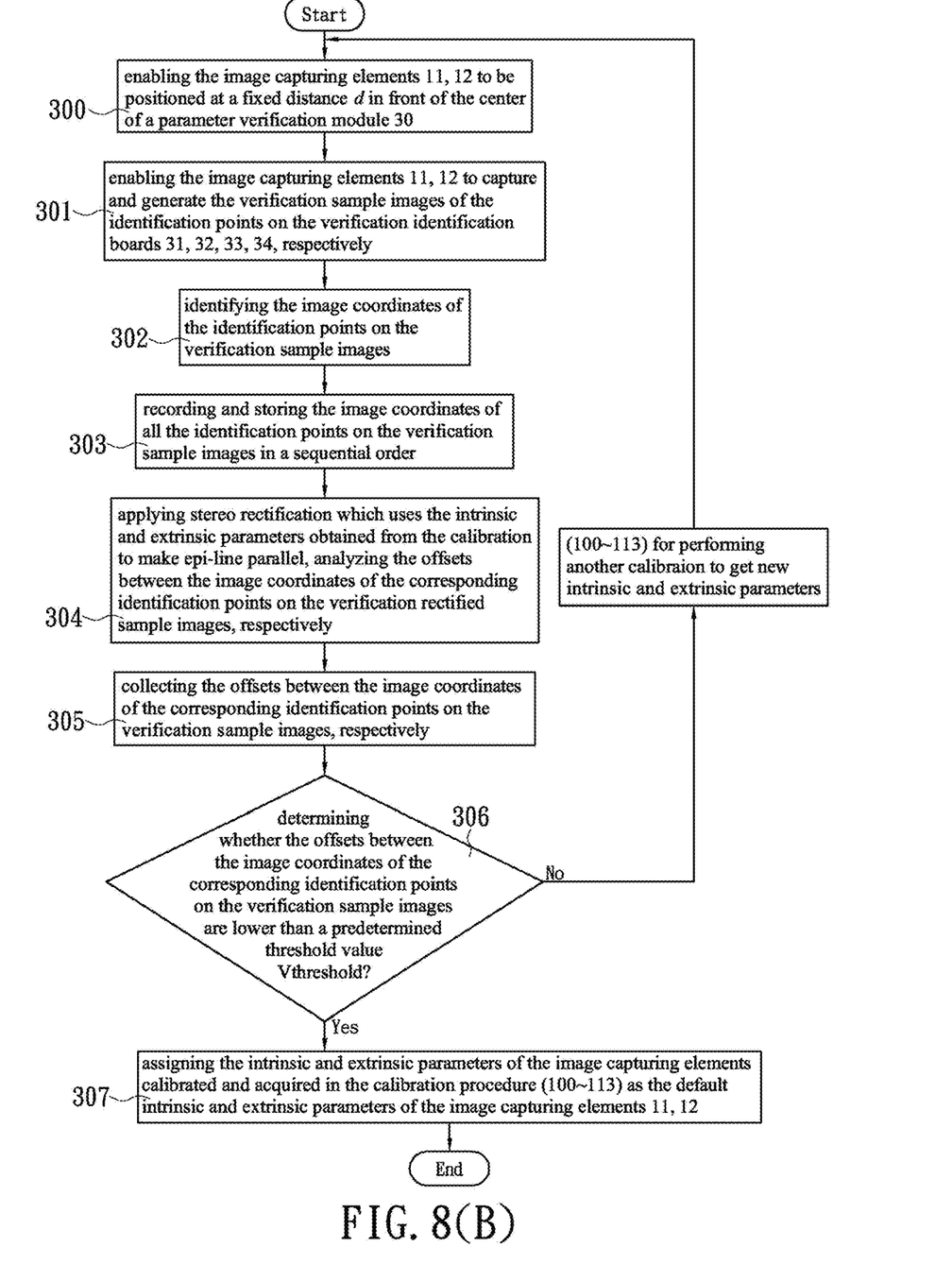
FIG. 8(B) is a flowchart of the verification procedure of the method of the present invention.

In the meantime, after the intrinsic and extrinsic parameters of the image capturing elements 11, 12 are acquired and calibrated, the method further comprises a verification procedure having steps, please refer to FIG. 8(B), to be performed by the electronic device 10, of:

(300) again refer to FIG. 5, enabling the image capturing elements 11, 12 to be positioned at a fixed distance d in front of the center of a parameter verification module 30, wherein the parameter verification module 30 is integrally formed by four verification identification boards 31, 32, 33, 34 each having a chess pattern printed thereon and arranged in parallel with each other, and the chess pattern includes a plurality of chess lattices S and a plurality of identification points representing the corner point of each chess lattice S, respectively; wherein the fixed distance d should be large enough to allow the fields of view of the image capturing elements 11, to be large enough (like wide-angle camera) and to be able to capture all the identification points on the verification identification boards 31, 32, 33, 34; while for the image capturing element 11, 12 which has smaller FOV (like tele focal-length camera), the verification sample images of the identification points on the identification boards 31, 32, 33, 34 exceeding the sight of the image capturing element 11, 12 having smaller FOV are acceptable. In addition, due to precise design, the pre-defined distance d for verification can be the same as the distance for calibration.

(301) enabling the image capturing elements 11, 12 to capture and generate the verification sample images of the identification points on the verification identification boards 31, 32, 33, 34, respectively;

(302) identifying the image coordinates of the identification points on the verification sample images;

(303) recording and storing the image coordinates of all the identification points on the verification sample images in a sequential order; and (304) after applying stereo rectification which uses the intrinsic and extrinsic parameters obtained from the calibration to make epi-line parallel, wherein the epi-line represents the Epipolar lines, which are the projection of the rays casting from one image capturing elements 11 onto the other image capturing element 12, thus, if the corresponding Epipolar lines are horizontal and on the same line: the movement of the image capturing elements 11, 12 is pure translation in the u direction and then simplifies the dense stereo corresponding problem (since the corresponding points in the image of one image capturing element 11 can be found on the same line within the image of the other image capturing element 12). From this reason, the stereo rectification is to make epi-line in parallel with each other and, in this way, simplify the process of calculating depth; analyzing the offsets between the image coordinates of the corresponding identification points on the verification rectified sample images, respectively;

(305) collecting the offsets between the image coordinates of the corresponding identification points on the verification sample images, respectively;

(306) determining whether the offsets between the image coordinates of the corresponding identification points on the verification sample images are lower than a predetermined threshold value $V_{threshold}$?; if No, repeating calibration steps (100-113) to obtain new calibrated intrinsic and extrinsic parameters of the image capturing elements 11, 12 and then repeating verification steps (300-306) to verify the correctness of the new data; if yes, going to (307).

(307) assigning the intrinsic and extrinsic parameters of the image capturing elements calibrated and acquired in the calibration procedure (100)~(113) as the default intrinsic and extrinsic parameters of the image capturing elements 11, 12 which have been verified to be eligible being used by the electronic device 10 in performing a precise and clear optical zooming mechanism, in performing a precise and clear stitching mechanism for producing a panoramic image of high image quality, or in performing a reconstructing mechanism for producing a 3D image of high image quality by utilizing the images respectively captured by the image capturing elements 11, 12 according to the default intrinsic and extrinsic parameters of the image capturing elements 11, 12.

While the invention herein disclosed has been described by means of specific embodiments, numerous modifications and variations could be made thereto by those skilled in the art without departing from the scope of the invention set forth in the claims.

What is claimed is:

1. A method for performing calibration and verification of intrinsic and extrinsic parameters of a plurality of image capturing elements installed on electronic device, which is applied to the electronic device and comprises steps, to be performed by the electronic device, of:

enabling image capturing elements to be positioned at a fixed distance in front of the center of a parameter calibration module, wherein the parameter calibration module is formed by four calibration identification boards each having a chess pattern printed thereon and arranged in parallel in a predetermined angle with each other, and the chess pattern includes a plurality of chess lattices and a plurality of identification points representing the corner points of each chess lattice, respectively;

enabling the image capturing elements to capture calibration sample images of the identification points on the calibration identification boards, respectively;

identifying image coordinates of all the identification points on the calibration sample images;

recording and storing the image coordinates of all the identification points on the calibration sample images in a sequential order; and calibrating the intrinsic and extrinsic parameters of the image capturing elements through an optimization algorithm according to the image coordinates of the corresponding identification points on the calibration sample images;

after the intrinsic and extrinsic parameters of the image capturing elements are calibrated:

enabling the image capturing elements to be positioned at a fixed distance in front of the center of a parameter verification module, wherein the parameter verification module is formed by four verification identification boards each having a chess pattern printed thereon and arranged in parallel with each other, and the chess pattern includes a plurality of chess lattices and a plurality of identification points representing the corner points of each chess lattice, respectively;

enabling the image capturing elements to capture the verification sample images of the identification points on the verification identification boards, respectively;

identifying the image coordinates of the identification points on the verification sample images;

recording and storing the image coordinates of all the identification points on the verification sample images s in a sequential order;

analyzing and correcting the offset between the image coordinates of the corresponding identification points on the verification sample images, respectively;

determining whether the offset between the image coordinates of the corresponding identification points on the verification sample images is lower than a predetermined threshold value; and when it is determined that the offset between the image coordinates of the corresponding identification points on the corresponding verification sample images is lower than a predetermined threshold value, assigning the calibrated intrinsic and extrinsic parameters of the image capturing elements as the default intrinsic and extrinsic parameters of the image capturing elements eligible to be used by the electronic device in performing a precise and clear optical zooming mechanism, in performing a precise and clear stitching mechanism for producing a panoramic image of high image quality, or in performing a reconstructing mechanism for producing a 3D image of high image quality by utilizing the images respectively captured by the image capturing elements according to the default intrinsic and extrinsic parameters of the image capturing elements.

2. The method of claim 1, wherein the optimization algorithm is one of a gradient descent algorithm, a conjugate gradient algorithm, or a Levenberg-Marquardt algorithm.

3. The method of claim 2, wherein the fixed distance is in an amount for allowing the fields of view of the image capturing elements to clearly capture all the identification points on the calibration identification boards.

* * * * *